(12) United States Patent
Unsuree et al.

(10) Patent No.: US 12,216,047 B2
(45) Date of Patent: Feb. 4, 2025

(54) FOURIER TRANSFORM SPECTROMETER AND METHOD OF FOURIER TRANSFORM SPECTROSCOPY

(71) Applicant: The University of Manchester, Manchester (GB)

(72) Inventors: Nawapong Unsuree, Bangkok (TH); Tim Echtermeyer, Stockport (GB)

(73) Assignee: THE UNIVERSITY OF MANCHESTER, Manchester (GB)

( * ) Notice: Subject to any disclaimer, the term of this patent is extended or adjusted under 35 U.S.C. 154(b) by 256 days.

(21) Appl. No.: 18/002,564

(22) PCT Filed: Jun. 29, 2021

(86) PCT No.: PCT/GB2021/051650
§ 371 (c)(1),
(2) Date: Dec. 20, 2022

(87) PCT Pub. No.: WO2022/003345
PCT Pub. Date: Jan. 6, 2022

(65) Prior Publication Data
US 2023/0341320 A1 Oct. 26, 2023

(30) Foreign Application Priority Data
Jul. 1, 2020 (GB) ..................................... 2010039

(51) Int. Cl.
*G01N 21/35* (2014.01)
(52) U.S. Cl.
CPC ..... *G01N 21/35* (2013.01); *G01N 2021/3595* (2013.01); *G01N 2201/0636* (2013.01)
(58) Field of Classification Search
CPC ........... G01N 21/35; G01N 2021/3595; G01N 2201/0636; G01J 3/26; G01J 3/4535; G01J 3/0259
See application file for complete search history.

(56) References Cited

U.S. PATENT DOCUMENTS
2016/0282184 A1 9/2016 Khalil et al.

FOREIGN PATENT DOCUMENTS
WO 2001007878 A1 2/2001

OTHER PUBLICATIONS

Chai et al. "Review of MEMS based Fourier Transform Spectrometers," Micromachines 2020, 11, 214 (Year: 2020).*

(Continued)

*Primary Examiner* — David P Porta
*Assistant Examiner* — Meenakshi S Sahu
(74) *Attorney, Agent, or Firm* — Hamilton, Brook, Smith & Reynolds, P.C.

(57) ABSTRACT

A Fourier transform spectrometer comprising an interferometer comprising a fixed mirror, a movable mirror and a detector, wherein: the mirrors are positioned parallel to each other and form an optical cavity; the movable mirror is operable to move relative the fixed mirror to change the size of the optical cavity; a first mirror of the mirrors is positioned such that light received from a sample enters the optical cavity through a back of the first mirror; the detector is positioned and operable to detect light which has exited the optical cavity through a back of the second mirror of the mirrors and output an interferogram; and the mirrors are distanced from each other such that the movable mirror is at or can move to a position where at least two paths to the detector for received light reflected within the interferometer are equal length.

15 Claims, 12 Drawing Sheets

(56) References Cited

OTHER PUBLICATIONS

Search Report for Application No. GB2010039.2, dated Jan. 5, 2021 (4 pages).
Notification of Transmittal of the International Search Report and the Written Opinion of the International Searching Authority, or the Declaration for International Application No. PCT/GB2021/051650 "Fourier Transform Spectrometer and Method of Fourier Transform Spectroscopy," date of mailing: Oct. 4, 2021.
Ebermann, M., et al., "Tunable MEMS Fabry-Perot filters for infrared microspectrometers: A review," [Proceedings of SPIE ISSN 0277-786X vol. 10524], SPIE, US, vol. 9760, pp. 97600H-20, XP060070264, Mar. 15, 2016.
Neumann, N. et al., "Turnable infrared detector with intergrated micromachined Febry-Perot filter," J. Micro/Nanolith. MEMS MOEMS vol. 7, No. (2) pp. 21004-1 (Apr. 1, 2008).
Tuohiniemi, M., "Silicon-based surface micromachined interferometers for infrared wavelengths," Aalto University, School of Chemical Technology, Department of Materials Science and Engineering, Doctoral Dissertations 54/2015, Jan. 1, 2015.
International Preliminary Report on Patentability, for PCT/GB2021/051650, dated: Dec. 13, 2022 (8 pages).

\* cited by examiner

FOURIER TRANSFORM SPECTROMETER AND METHOD OF FOURIER TRANSFORM SPECTROSCOPY

RELATED APPLICATIONS

This application is the U.S. National Stage of International Application No. PCT/GB2021/051650, filed Jun. 29, 2021, which designates the U.S., published in English, and claims priority under 35 U.S.C. § 119 or 365(c) to Great Britain Application No. 2010039.2, filed Jul. 1, 2020. The entire teachings of the above applications are incorporated herein by reference.

TECHNICAL FIELD OF THE INVENTION

The present invention relates to Fourier transform spectrometers and methods of Fourier transform spectroscopy. In particular but not exclusively it relates to infra-red Fourier transform spectrometers and spectroscopy

BACKGROUND TO THE INVENTION

Every molecule and/or substance has a distinctive absorption spectrum, absorbing different wavelengths of light to different extents. FIG. 1 shows an example absorption spectrum, in this case the spectrum of dichloromethane. As such, a molecule and/or substance and its composition can be determined using spectroscopy by obtaining its absorption spectrum.

Given the ability to determine molecules and/or substances and their composition, spectroscopy has a broad range of uses, including:
- food quality monitoring (e.g. food contamination or dating);
- environmental monitoring (e.g. air pollution or water quality);
- medical (e.g. blood analysis and drug testing); and
- material control.

However, many currently available spectrometers are relatively bulky and/or costly, limiting their use outside of a laboratory setting and so limiting their usability. For uses outside the laboratory, spectrometers need to be miniaturised while also being less costly. The ideal spectrometer would be scalable down to a few millimetres squared in size and cheap enough so that it can be incorporated into mobile electronic devices.

There are three main set ups for spectrometers which are capable of being miniaturised: a grating, a Fabry-Perot interferometer and a Michelson interferometer.

A grating is shown in FIG. 2. For a grating, light 1 which has been incident on a sample is directed to the grating 2 at incident angle $\alpha$. The light passing through or reflected off the different slits in the grating interfere, resulting in an output angle $\beta$ dependent interference pattern 3 which can be detected by a detector. Given wavelength determines the position of maxima and minima in the pattern for each wavelength of light, the detector can detect a number of wavelengths and so build up a spectrum.

A wide array of detectors is required to detect enough of the pattern 3 and obtain all the necessary information to form a full absorption spectrum. In addition, the pattern 3 needs sufficient space to spread out to achieve sufficient resolution. Finally, due to higher order reflections a grating has limited free-spectral range. These issues mean there is a limit to how far spectrometers using gratings are can be miniaturised, and the resulting spectrometers have a limited optical frequency range.

A Fabry-Perot interferometer is shown in FIG. 3. Light 1 which has been incident upon a sample is transmitted through a first mirror 4 into a cavity formed between two parallel mirrors 4, 5. The light 1 is reflected between the mirrors 4, 5, and only the wavelength of the light 1 which is resonant with the cavity size will transmit through the second mirror 5, the light 6 then passing on to the detector The distance between the mirrors 4, 5 can be changed, such that a user can scan through different wavelengths of light. This way the spectrometer can move through the various wavelengths, building up the absorption spectrum.

There are a few issues with using Fabry-Perot interferometers. A Fabry-Perot interferometer requires homogenous mirror-spacings in the order of the light wavelength, which is difficult to manufacture. A further issue is that higher order reflections mean the interferometer has limited free-spectral range. In addition, Fabry-Perot interferometers require high quality optical mirror surfaces, typically layered Bragg mirrors. This means a spectrometer using a Fabry-Perot interferometer is both relatively expensive to manufacture and has a limited optical frequency range.

Further to the above, to construct a Bragg mirror alternating layers of different materials are required. Standard micro-electromechanical system (MEMS) processing techniques, such as vapour-phase hydrofluoric acid, are incompatible with many materials and therefore limit material choices when scaling down a spectrometer using a Fabry-Perot interferometer.

A Michelson interferometer is shown in FIG. 4. Light 1 is incident upon a beam splitter 7, at which point part of the beam is reflected to a top mirror 8 and the other part is transmitted through the beam splitter to a side mirror 9. The parts are reflected back to the beam splitter 7, where they recombine. The position of the side mirror 9 is adjustable, such that the optical path length for one part of the light can be changed and so introduce an optical path difference.

A Michelson interferometer is used as part of a Fourier transform infra-red spectrometer. The side mirror 9 is rapidly moved, the detector recording as the side mirror 9 is moved. The side mirror 9 must be moved from an optical path difference of zero to the maximum resolution desired, although it is typically easier to move the mirror through the position where the optical path difference of zero falls. The resulting recorded output can be converted via a Fourier transform into the absorption spectrum.

A Fourier transform infra-red spectrometer has a broad wavelength range and high spectral resolution, along with a high signal-to-noise ratio (i.e. Fellgett's advantage) in comparison to the grating and Fabry-Perot. However, there are still issues associated with miniaturising a Fourier transform infra-red spectrometer. The 90 degrees rotated beam paths are difficult to manufacture when scaled down, and especially difficult to mass manufacture, meaning it is difficult to provide a scaled down spectrometer at a sufficiently reduced cost.

In addition, there are difficulties involved in providing two optical path lengths which can be equal when designing a MEMS, due to issues such as pull-in effects and tuning ranges. Furthermore, light must be coupled into and out of such systems via optical fibres, further increasing the difficulties (and associated costs) of manufacturing the systems.

Further to the above, for many miniaturised spectrometers a comb drive is used to move the movable mirror. The need for a comb drive increases the physical device size and the costs involved, since they are relatively complex to manufacture.

It is an aim of the present invention to overcome some or all of the problems associated with the spectrometers and methods of spectroscopy described above.

SUMMARY OF THE INVENTION

According to a first aspect of the present invention there is provided a Fourier transform spectrometer comprising an interferometer comprising a fixed mirror, a movable mirror, a circuit, an electrode and a detector, wherein: the mirrors are positioned parallel to each other and form an optical cavity; the movable mirror is operable to move relative to the fixed mirror to change the length of the optical cavity; a first mirror of the mirrors is positioned such that light received enters the optical cavity through a back of the first mirror; the detector positioned and operable to detect light which has exited the optical cavity through a back of the second mirror of the mirrors and output an interferogram; the mirrors are distanced from each other such that the movable mirror is at or can move to a position where at least two optical paths to the detector for received light reflected within the interferometer are of equal length; the movable mirror and electrode positioned at a distance from each other and the circuit connected to the movable mirror and the electrode and operable to apply an electric field between them to move the movable mirror with respect to the fixed mirror; and the electrode is positioned such that the movable mirror lies between the fixed mirror and the electrode.

The Fourier transform spectrometer of the present invention can apply a Fourier transform to certain higher order combinations of the interferences of these multiple reflections, which are caused when at least two optical paths of light reflected within interferometer are of equal length. This is in contrast to the Fourier transform spectrometer using the Michelson interferometer, in which only one reflection occurs at each mirror surface and the Fourier transform is applied to the interference of the two zero-order reflected beams only. Measuring the zero-order interference of two beams reflected from the front-side of the mirrors in the 'in-line' set up of the mirrors and detector required is impossible, since it occurs when the path difference of reflected light and light transmitted straight through the optical cavity are equal and so occurs when the distance between the mirrors is zero.

The spectrometer combines the advantages of placing the mirrors and detector 'in-line' with each other and the light from a sample (the spectrometer being easier, and accordingly cheaper, to miniaturise) while still being a Fourier transform spectrometer with the associated advantages (a broad wavelength range, high spectra resolution and a high signal-to-noise ratio).

The mirrors may be distanced from each other such that the movable mirror can move through a position where at least two paths for light reflected within the interferometer are equal length.

The interferometer may comprise three or more reflecting surfaces, arranged so received light on the optical paths to the detector reflect off two or more of the reflecting surfaces.

One or more of the mirrors may comprise one or more of the reflecting surfaces. One or more of the mirrors may comprise two or more of the reflecting surfaces. The or each front of one or more of the mirrors may be a reflecting surface. The or each back of one or more of the mirrors may be a reflecting surface. Each reflecting surfaces may be operable to reflect received light from its front and/or back. The reflecting surfaces may be arranged so received light on two or more of the optical paths may reflect off one or more of the same reflecting surfaces.

The mirrors may be arranged so received light on one or more of the optical paths reflects within one or more mirrors. The mirrors may be arranged so received light on one or more of the optical paths reflects within the optical cavity. The mirrors may be arranged so received light on one or more of the optical paths takes a round trip in one or more of the mirrors. The mirrors may be arranged so received light on one or more of the optical paths takes a round trip in the optical cavity.

One or more of the mirrors may have a coating on its front and/or back. The coating may be an anti-reflection coating. One or more of the coatings may each comprise one or more of the reflecting surfaces. One or more of the coatings May comprise an electrical insulator. The fixed mirror may have a coating on its front. The fixed mirror may have a coating on its back. The movable mirror may have an uncoated front. The movable mirror may have an uncoated back.

The Fourier transform spectrometer may comprise a light source, positioned to direct light through the back of the first mirror into the optical cavity.

The Fourier transform spectrometer may comprise a sample holder, operable to receive and hold a sample in position for light from a light source to pass through or reflect off the sample before entering the optical cavity.

Each mirror may comprise silicon. Each mirror may constitute silicon.

Making the mirrors from silicon only can simplify the process of forming the Fourier transform spectrometer, since no Bragg mirrors need to be fabricated, for example.

Each mirror may be flat. Each mirror may be rectangular. The first mirror may be the fixed mirror. The second mirror may be the movable mirror.

The interferometer may comprise a housing. The mirrors may be connected to the housing. The fixed mirror may be connected to the housing such that its position is fixed relative the housing. The fixed mirror may be connected to the housing by being intrinsically formed with it. The movable mirror may be connected to the housing such that it can move relative the housing. The motion of the movable mirror may be elastic. The interferometer may comprise one or more elastic elements connecting the movable mirror to the housing, the movable mirror movable upon the or each elastic element. The or each elastic element may be a flexure. The or each flexure may be a spiral flexure. The second mirror may be circular. The or each spiral flexure may partially or completely encircle the circular mirror. There may be four flexures. When there is a plurality of flexures, the positions at which each flexure connects to the mirror and/or the housing may be spaced from each other at regular intervals. The or each flexure may encircle the mirror 360 degrees before connecting to the housing. The or each flexure may comprise silicon. The or each elastic element may consist of silicon.

The Fourier transform spectrometer may comprise an analysis unit operable to receive the interferogram and perform a Fourier transform on it to obtain an spectrum for the sample. The analysis unit may be operable to perform the Fourier transform on certain higher-order combinations of the multiple reflections, other than the zero-order interference. The analysis unit may be operable to perform the Fourier transform on the first-order interference. The spectrum may cover the range 1-2.6 µm of wavelengths. The spectrum may cover one or more, or all, of the following ranges: visible, near infra-red, short wavelength infra-red, medium wavelength infra-red, and/or long wavelength infra-red.

The Fourier transform spectrometer comprises a circuit and an electrode, the circuit connected to the movable mirror and the electrode and operable to apply an electric field between them to move the movable mirror with respect to the fixed mirror. The circuit may be operable to apply a voltage difference between the movable mirror and the electrode to apply the electric field. The electrode is positioned such that the movable mirror lies between the fixed mirror and the electrode. The circuit may be operable to apply a voltage difference between the movable mirror and the electrode to apply the electric field.

By positioning the electrode such that the movable mirror is between it and the fixed mirror, the means of actuating the movable mirror (the application of an electric field between it and the electrode) is decoupled from the optic cavity. If the electric field were applied across the optic cavity (i.e. between the fixed mirror and the movable mirror), the range of movement of the movable mirror and the minimum size of the optical cavity will be limited to approximately a third of the original distance between the mirrors. If the movable mirror were moved closer, the size of the electric field required would result in pull-in occurring.

By positioning the electrode as described pull-in does not limit the minimum size of the optical cavity or the range through which the movable mirror can be moved, since when the electric field is zero the movable mirror is as close as desired to the fixed mirror and as the electric field is increased the movable mirror moves away from the fixed mirror.

The electrode may be positioned between the movable mirror and the detector. The electrode may have an aperture through it. The detector may be positioned underneath the aperture. The detector may be positioned within the aperture. The electrode may be positioned alongside the detector. The electrode and detector may be placed together on a base.

The electrode may comprise a 2D material. A 2D material is less than 10 nanometer thick. The 2D material may be electrically conductive. The 2D material may be transparent. The electrode may comprise graphene. The graphene may be electrically conductive. The graphene may be transparent. The electrode may comprise graphene on quartz. The electrode may constitute graphene on quartz. The graphene may have a thickness of less than 10 nanometers.

By forming the electrode out of graphene, the electrode can be transparent and ultimately thin and so not influence the optics of the interferometer even when it is positioned between the movable mirror and the detector.

The electrode may be parallel to each mirror. The electrode may form the base of the housing. Part of the walls may extend from the movable mirror to the electrode, distancing each from the other.

The mirrors may be distanced from each other such that the movable mirror is at or can move to a position where the optical cavity length is between 20-45 µm. The mirrors may be distanced from each other such that the movable mirror is at or can move to a position where the optical cavity length is between 25-40 µm. The mirrors may be distanced from each other such that the movable mirror is at or can move to a position where the optical cavity length is between 30-35 µm.

The movable mirror may be movable along a line. The line may be a straight line. The movable mirror may only be movable along the line. The line may extend perpendicularly from the movable mirror. The line may extend perpendicularly from the back of the movable mirror. The line may start at the back of the movable mirror.

The Fourier transform spectrometer may be an infra-red Fourier transform spectrometer.

According to a second aspect of the present invention there is provided a mobile electronic device comprising the Fourier transform spectrometer of the first aspect.

By providing the Fourier transform spectrometer in a mobile electronic device it is possible for the general public to make use of spectroscopy day-to-day, greatly expanding its use and its usability.

The mobile electronic device may be a mobile phone, a tablet, or a laptop.

According to a third aspect of the present invention there is provided an interferometer for use in a Fourier transform spectrometer, the interferometer comprising a fixed mirror and a movable mirror, the mirrors forming an optical cavity and the movable mirror operable to move relative the fixed mirror to change the size of the optical cavity, and a circuit and electrode, the circuit connected to the movable mirror and the electrode and operable to form an electric field between the two to move the movable mirror relative the fixed mirror, the movable mirror positioned between the fixed mirror and the electrode.

By positioning the electrode so that the movable mirror it is between it and the fixed mirror, the means of actuating the movable mirror (the application of an electric field between it and the electrode) is decoupled from the optic cavity. Accordingly, the pull-in does not limit the minimum size of the optical cavity or the range through which the movable mirror can be moved, since when the electric field is zero the movable mirror is as close as desired to the fixed mirror and as the electric field is increased the movable mirror moves away from the fixed mirror. The electrode may be positioned between the movable mirror and the detector.

The mirrors may be parallel to each other.

The third aspect of the present invention may comprise any of the optional features of the first aspect, as desired and/or appropriate.

According to a fourth aspect of the present invention there is provided a Fourier transform spectrometer comprising the interferometer of the third aspect.

According to a fifth aspect of the present invention there is provided an interferometer for use in a Fourier transform spectrometer, the interferometer comprising a housing, a movable mirror, one or more flexures, a circuit and an electrode, the movable mirror connected to the housing via the or each flexure and movable relative to the housing upon the or each flexure, the circuit connected to the movable mirror and the electrode and operable to apply an electric field between them to move the movable mirror.

The set-up required is much simpler to construct than a comb drive. Accordingly, the interferometer is easier and cheaper to manufacture.

The interferometer may comprise a fixed mirror, the fixed mirror and the movable mirror positioned to form an optical cavity and the movable mirror movable relative the fixed mirror. The mirrors may be parallel.

The fifth aspect of the present invention may comprise any of the optional features of the first aspect, as desired and/or appropriate.

According to a sixth aspect of the present invention there is provided a Fourier transform spectrometer comprising the interferometer of the fifth aspect.

According to a seventh aspect of the present invention there is provided a method of Fourier transform spectroscopy comprising the steps of moving a movable mirror of an interferometer from or through a position where at least two paths for light reflected within the interferometer are equal length and detecting light at a detector of the interferometer to obtain an interferogram for a sample, and applying a Fourier transform to an order of interference of the interferogram other than a zero-order interference to obtain a spectrum.

By applying the Fourier transform to an order of interference other than the zero-order interference, types of interferometers which cannot provide an interferogram for the zero-order interference but can for higher orders of interference can be used in the method. Such interferometers need not have 90 degrees rotated beams, and so it is easier and cheaper to build miniaturised spectrometers.

The method of Fourier transform spectroscopy may apply the Fourier transform to a first order interference.

The method of Fourier transform spectroscopy may use a Fourier transform spectrometer of the first aspect to perform the steps.

The method of Fourier transform spectroscopy may be a method of infra-red Fourier transform spectroscopy. The spectrum may cover the range 1-2.6 µm of wavelengths.

DETAILED DESCRIPTION OF THE INVENTION

In order that the invention may be more clearly understood one or more embodiments thereof will now be described, by way of example only, with reference to the accompanying drawings, of which:

Figure 1:
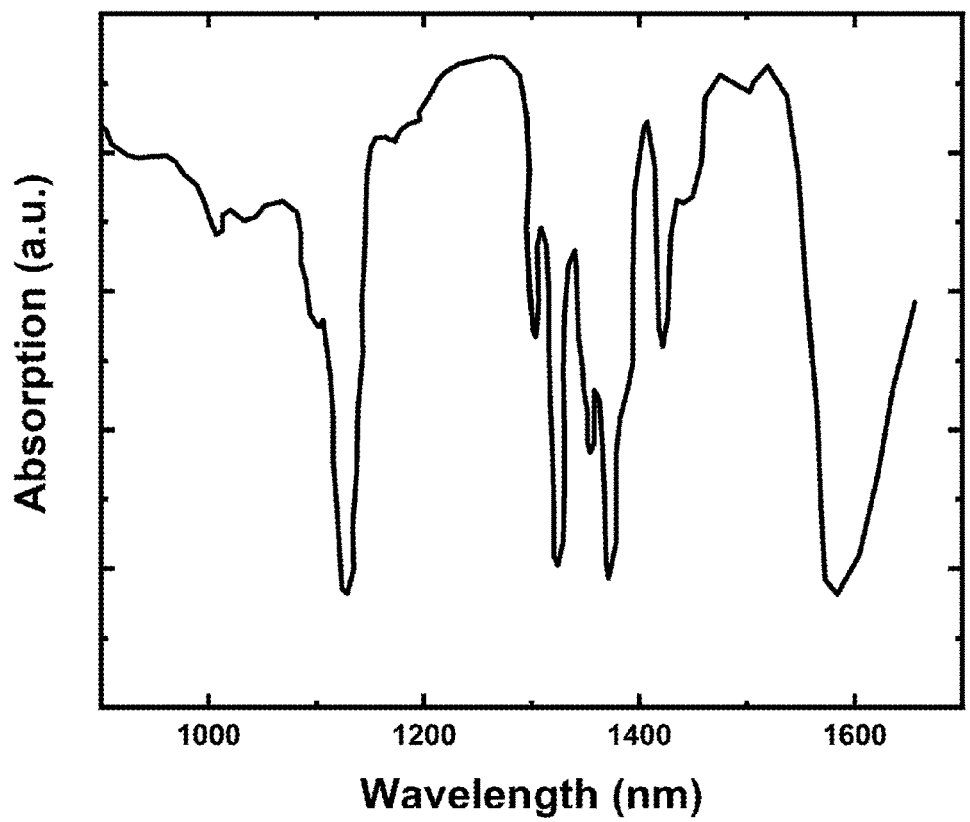
FIG. 1 is the absorption spectrum of dichloromethane.
Figure 2:
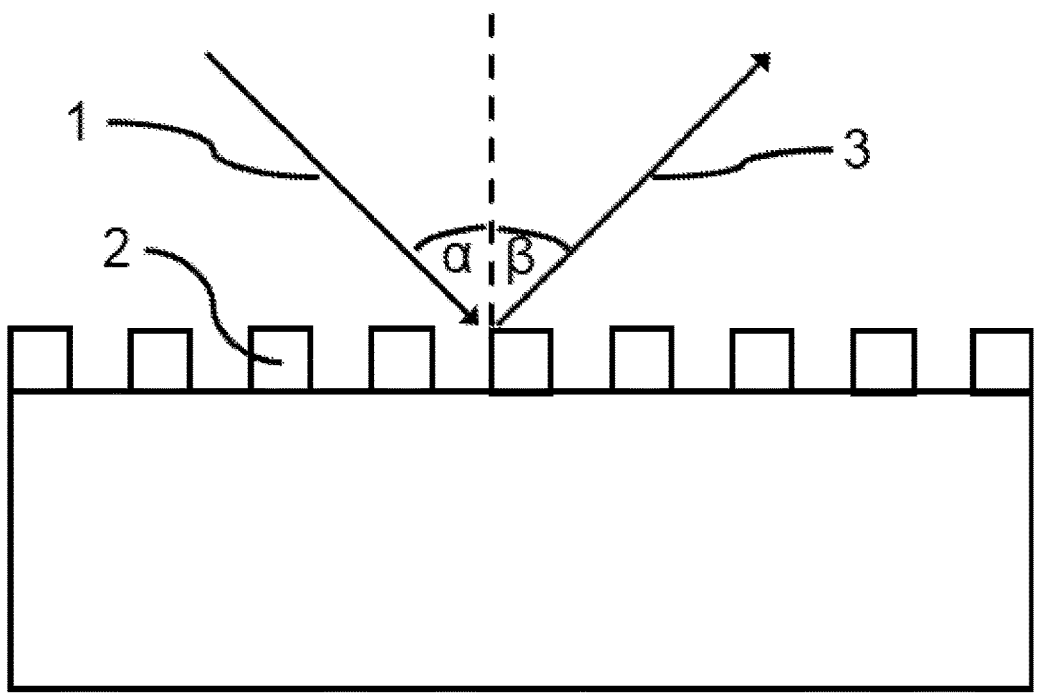
FIG. 2 is a grating setup.
Figure 3:
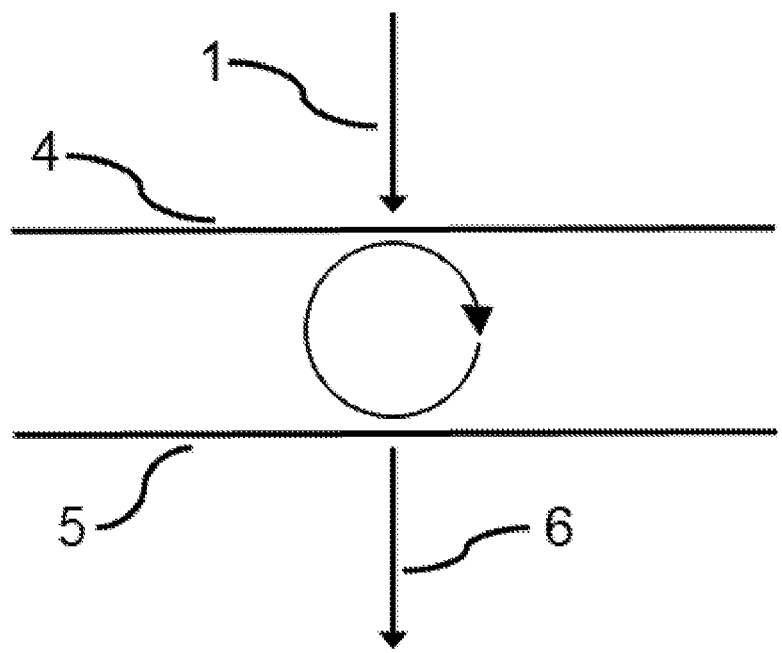
FIG. 3 is a Fabry-Perot interferometer.
Figure 4:
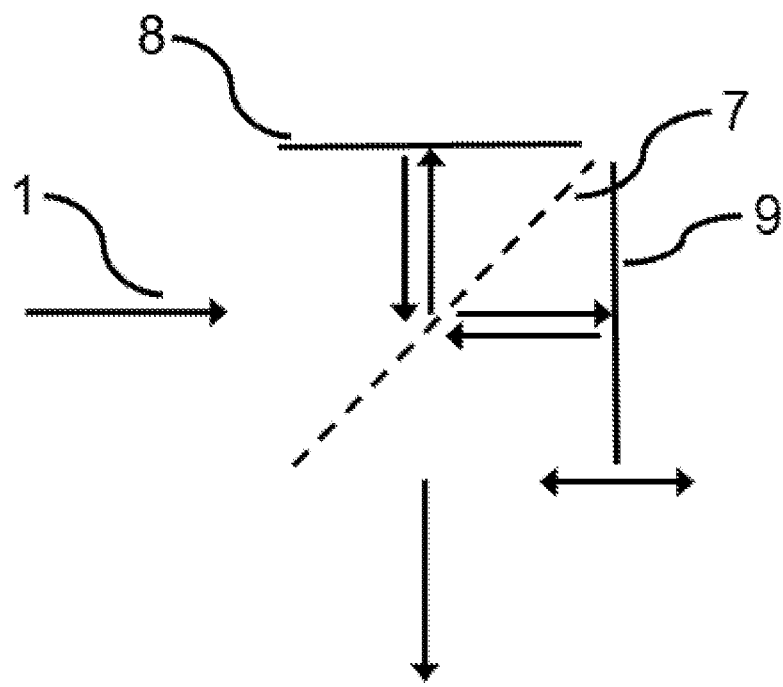
FIG. 4 is a Michelson interferometer.
Figure 5:
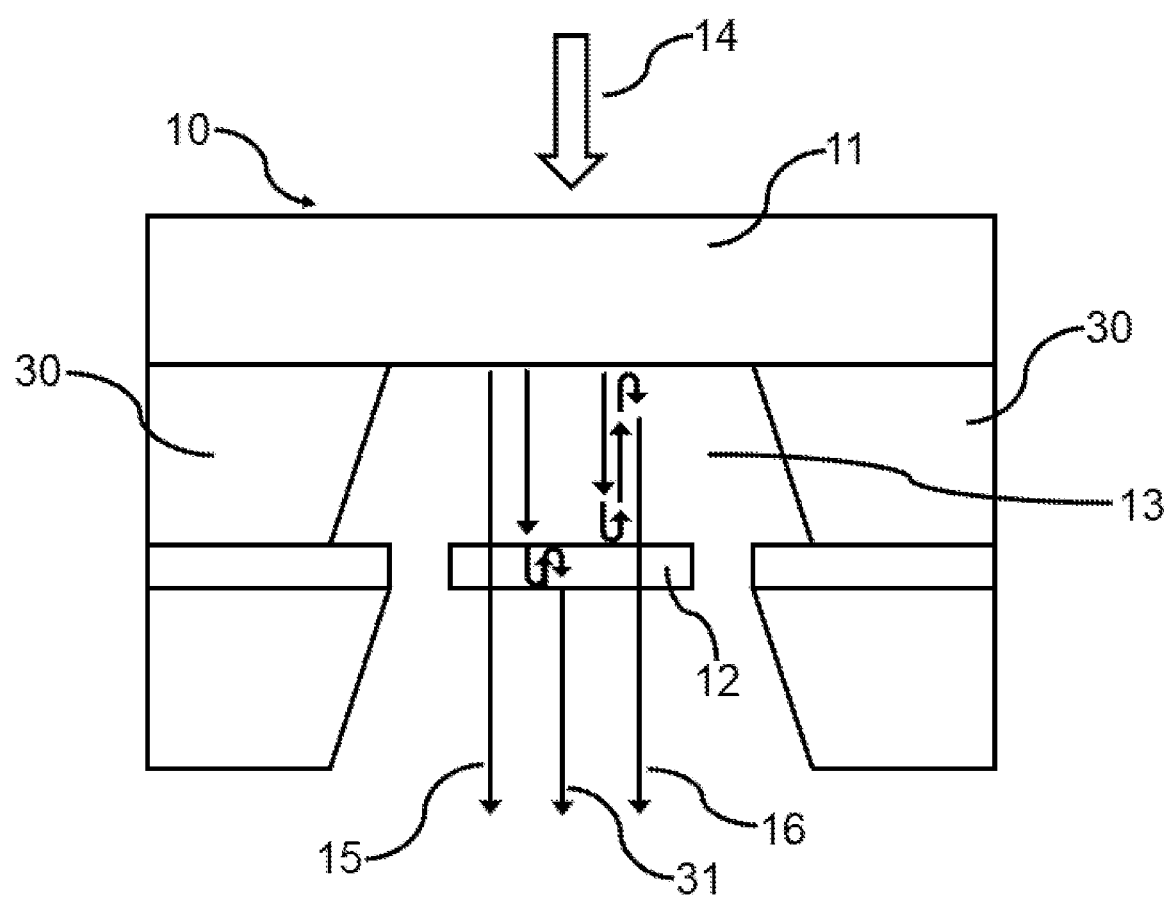
FIG. 5 is an interferometer of an infra-red Fourier Transform spectrometer.

As shown in FIG. 5, the interferometer 10 of the infra-red Fourier transform spectrometer comprises two mirrors 11, 12. The mirrors 11, 12 are parallel to and face each other to form a cavity 13, the first mirror 11 (the fixed mirror) being positioned above the second mirror 12 (the movable mirror). The second mirror 12 is movable relative to the first mirror 11, towards and away from it, to change the size of the cavity and distance between the mirrors 11, 12. The mirrors 11, 12 are held in a housing formed by two walls 30, the first mirror 11 intrinsically formed with the walls 30 and the second mirror 12 connected to the walls 30 such that it is movable relative to them.

Light 14 which has been incident upon a sample of interest is transmitted through the back of the first mirror 11. There are then multiple paths through the mirrors 11, 12 and the optical cavity 13. A first path 15 for the light is to be transmitted straight through the second mirror 12 out of the cavity 13, and the majority of the light 14 takes the first path 15. However, some of the light 14 takes other paths within and through the first and second mirrors 11, 12 and through the cavity 13. For example, as shown in FIG. 5, a second path 16 of the light is reflected back and forth between the front surfaces of the mirrors 11, 12 forming the cavity before being transmitted out of the back of the second mirror 12 and out of the cavity 13. A further path 31 for the light 14 is to reflect off the back and front surfaces within the second mirror 12 before leaving the back of the second mirror 12. Another example would be a path where light is reflected off the front and back surfaces with the first mirror 11 before entering the cavity 13 and being transmitted straight through the second mirror 12.

Figure 6:
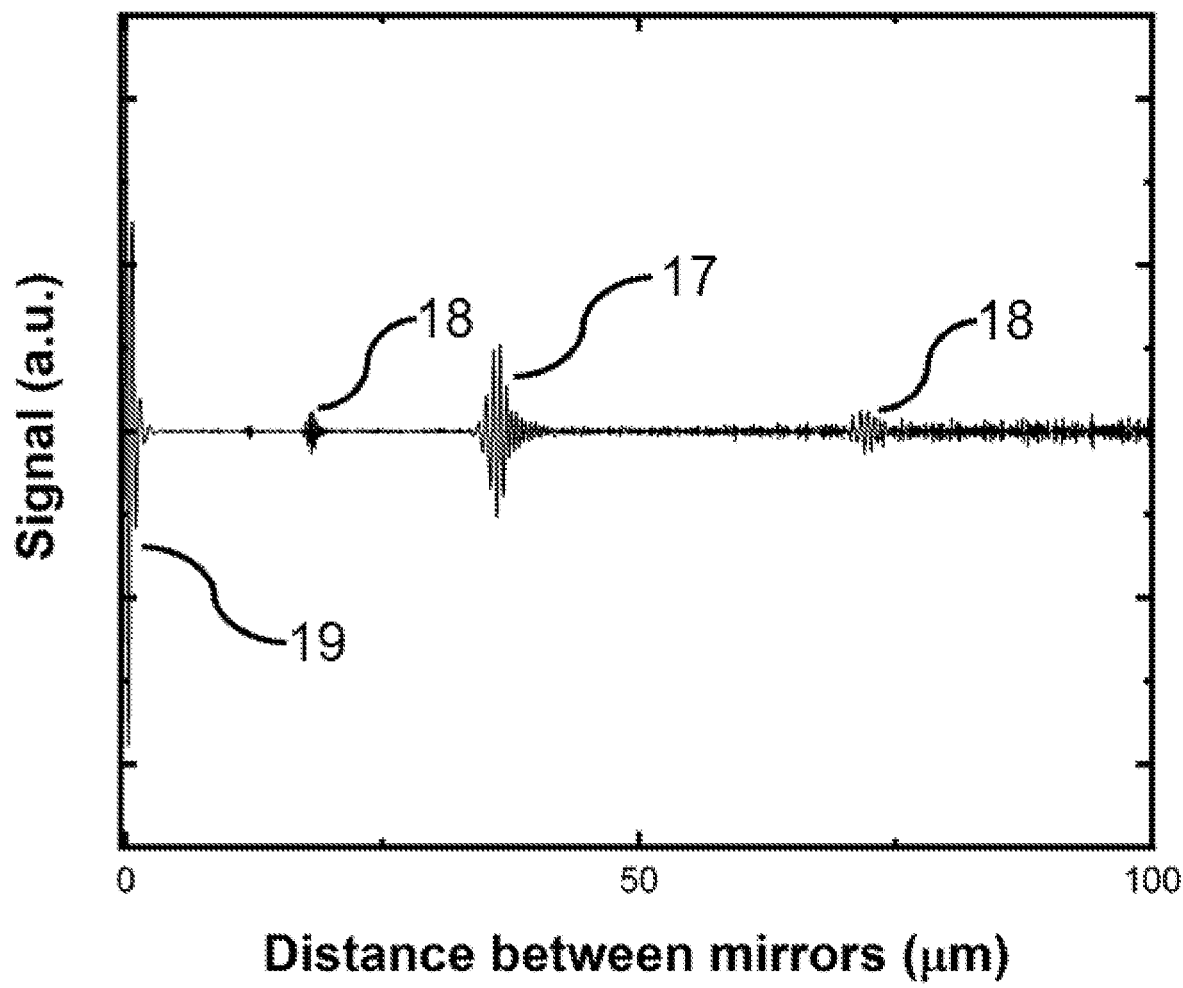
FIG. 6 is a simulated interferogram from an infra-red Fourier Transform spectrometer.

The position of the second mirror 12 can be adjusted such that path 31 (and other paths where light is reflected within the interferometer) can have the same length as the second path 16 and/or other paths for light reflected within the interferometer, resulting in interference. This interference is a higher order interference than 0th order interference, and is known as a "side burst" on the interferogram. As shown in FIG. 6, the side bursts 17, 18 are not as strong a signal as 0th order interference 19 between light on the first and second paths 15, 16. However, the first order side burst 17 is a large enough signal to convert into a spectrum, and since it occurs when the mirrors are at a distance from each other it is possible to obtain the full measurement of the side burst necessary to obtain a spectrum. In contrast, the 0th order interference occurs when the gap distance is zero, which is impossible to measure.

Figure 7:
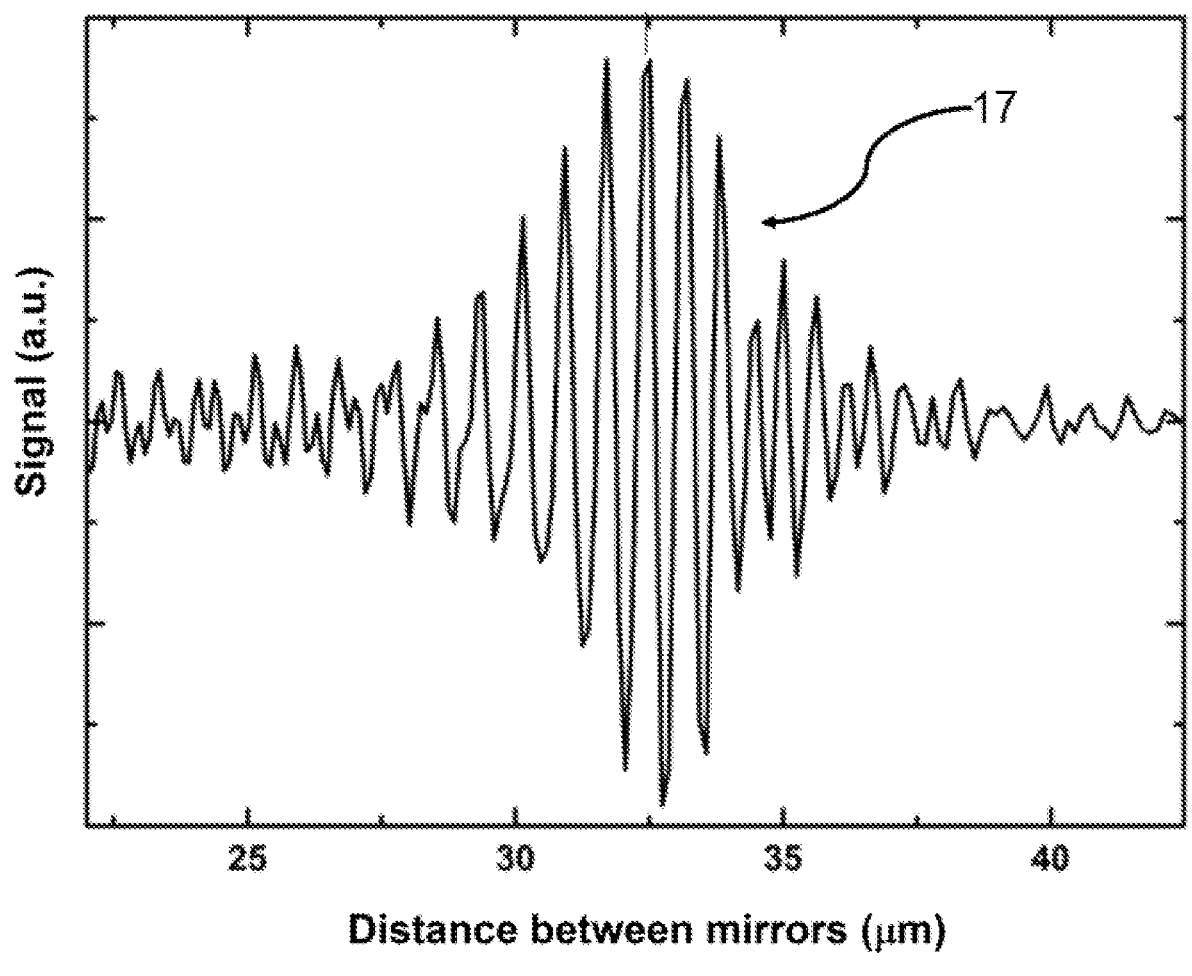
FIG. 7 is an interferogram of a first order side burst.

In use, the position of the second mirror 12 will be moved through the gap distance at which the second and third paths 16, 31 are of an equal length (or through a gap distance where two other paths, other than the first path 15, are of an equal length), which for the setup shown in described here is at approximately 35 µm. The detector 101 (shown in FIG. 13) measures while the second mirror 12 moves so as to capture the first order side burst 17, as shown in FIG. 7.

The displacement of the second mirror 12 is measured using a non-contact distance sensor such as a laser interferometer, capacitance sensor or similar.

Figure 8:
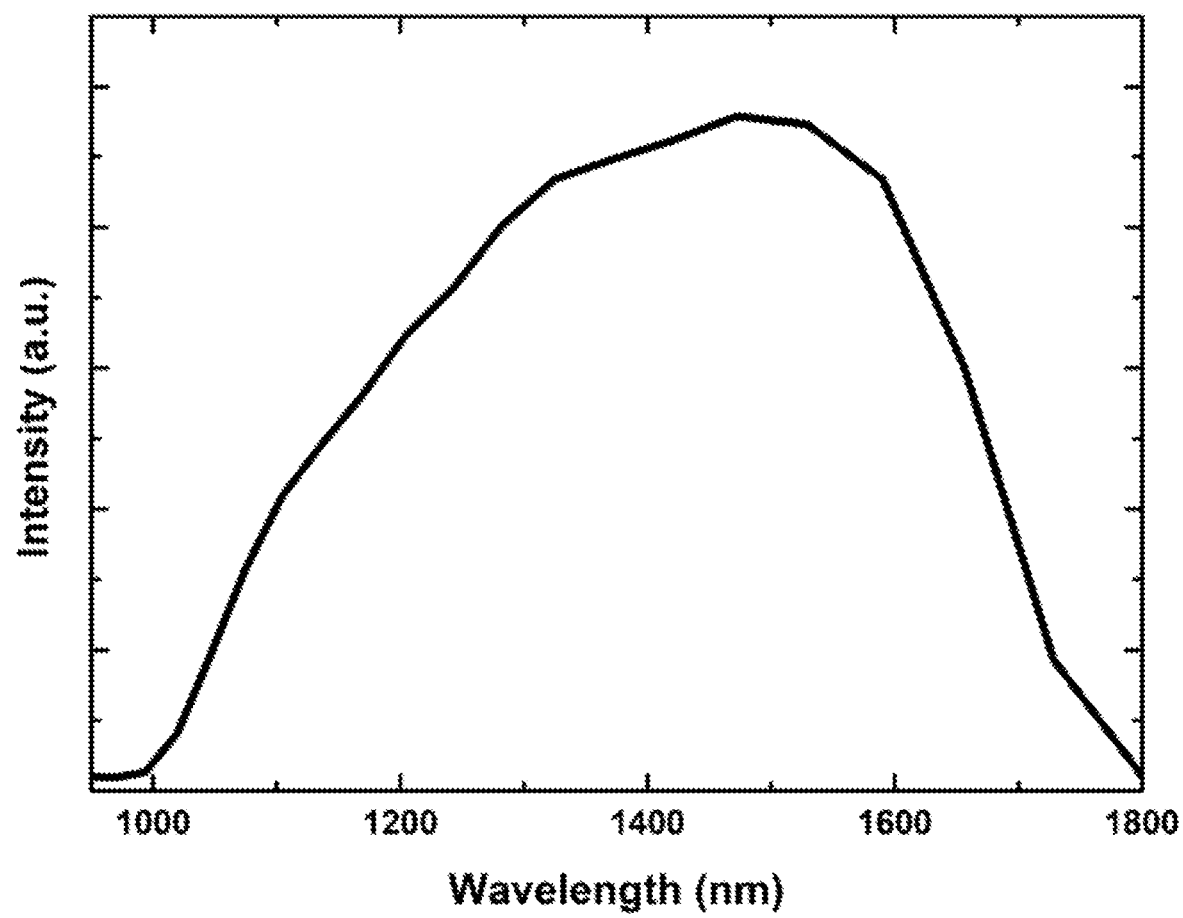
FIG. 8 is the spectrum of white light, captured by an infra-red Fourier Transform spectrometer.
Figure 13:
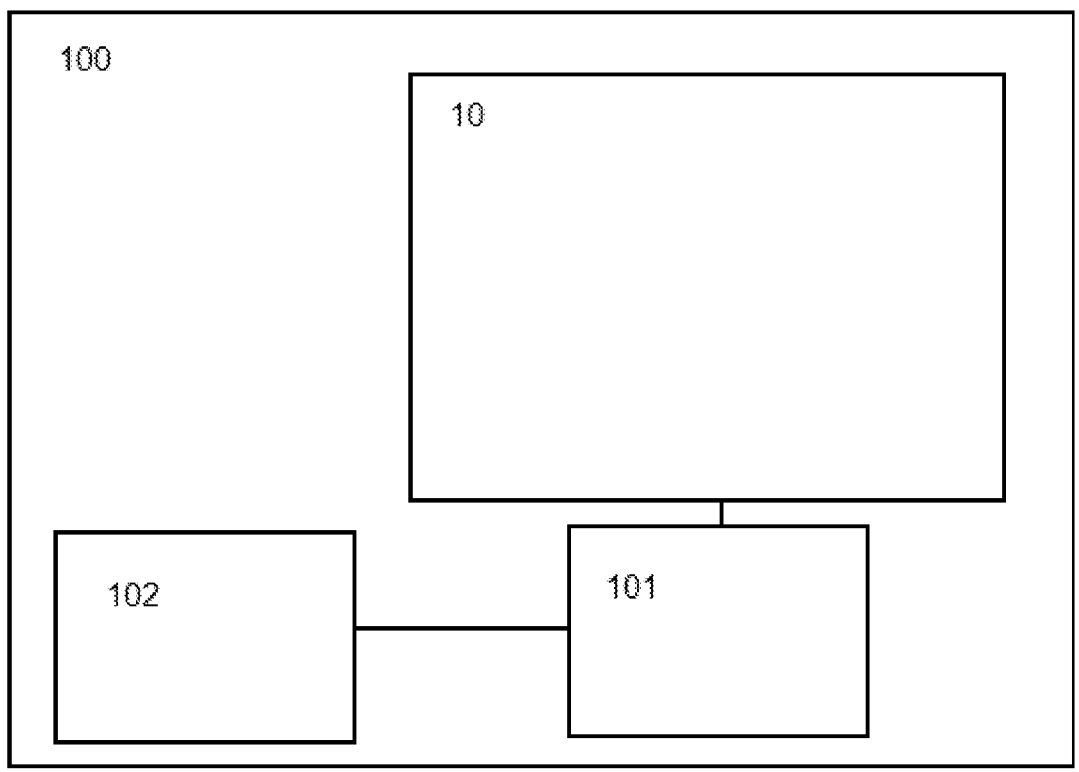
FIG. 13 shows an infra-red Fourier Transform spectrometer.

An analysis unit 102 of the Fourier Transform infra-red spectrometer 100, also shown in FIG. 13, can then perform a Fourier transform on the captured interferogram, resulting in the absorption spectrum. FIG. 8 shows the resulting constructed spectrum for white light, with no sample present.

Figure 9:
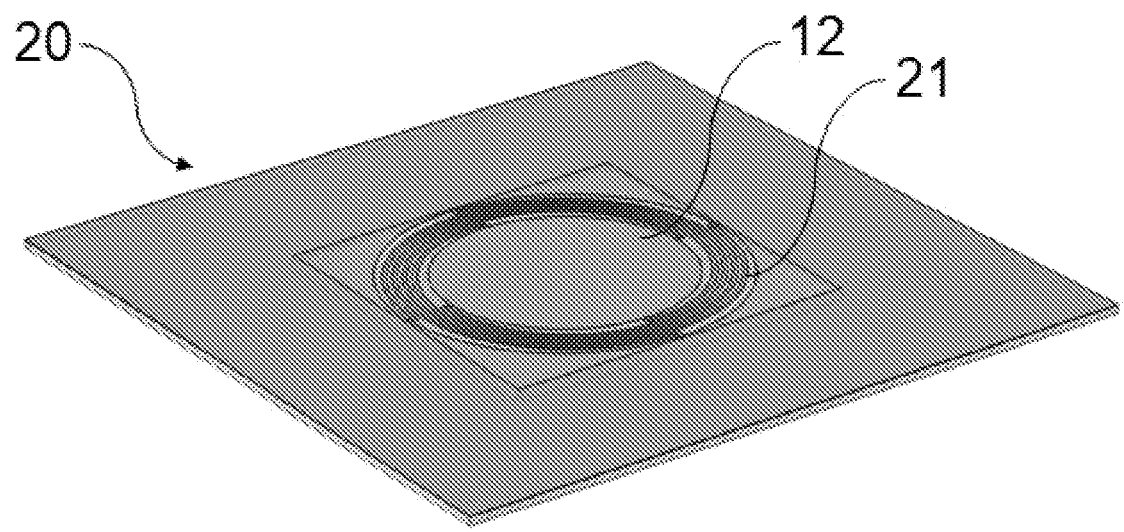
FIG. 9 is a second, movable mirror of the interferometer of FIG. 5.

The first and second mirrors 11, 12 consist of silicon. FIG. 9 shows the second mirror 12 used in the set up. The mirror 12 is circular and is partially cut out from a sheet of silicon 20. The mirror 12 remains connected to the rest of the sheet 20 by strips of silicon 21 spiralling from the mirror 12 to the rest of the sheet 20. The rest of the sheet 20 thereby forms part of the walls 30 of the interferometer 10. There are four flexures 21, each spiralling around the entire circumference of the mirror 12 such than the position at which a flexure 21 connects to the mirror 12 around the circumference is the same position, relative to the circumference, at which the flexure 21 connects to the rest of the sheet 20. There are four flexures 21, positioned regularly around the circumference.

The flexures 21 allow the second mirror 12 to move up and down with respect to the rest of the sheet 20 (i.e. move perpendicular to the plane of the sheet 20). This allows the mirror to move with respect to the first mirror 11, and so change the gap distance and size of the cavity 13.

Figure 10:
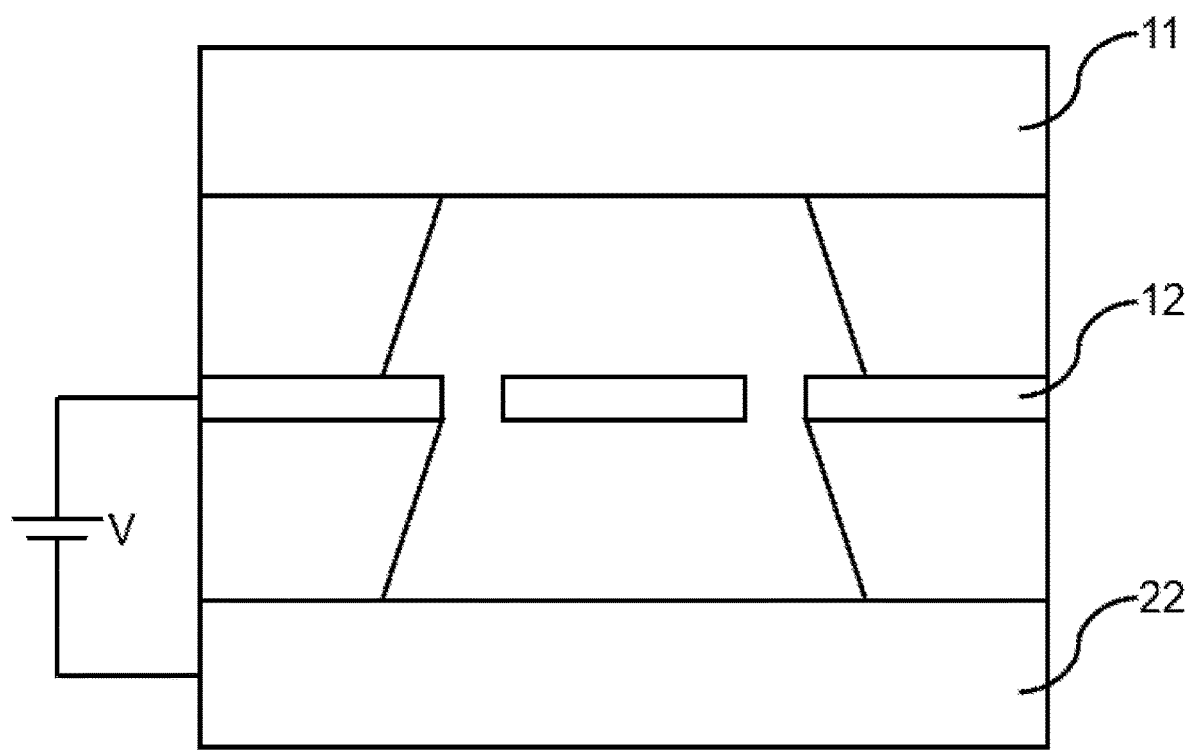
FIG. 10 is the interferometer of an infra-red Fourier Transform spectrometer, including the electrode and voltage source necessary to move the second mirror.

As shown in FIG. 10, an electrode is positioned at distance from the back surface of the second mirror 12, such that the first and second mirrors 11, 12 and the electrode 22 are in three parallel planes, the second mirror 12 between the first mirror 11 and the electrode 22. The second mirror 12 and the electrode 22 are connected such that a voltage can be applied between them, thereby forming an electric field. The second mirror 12 being a circular mirror held in place by spiralling flexures 21 means that the presence of an electric field will displace the second mirror 12 away from the first mirror 11 and towards the electrode 22, the distance of displacement dependent upon the strength of the electric field. The second mirror 12 can be displaced by tens of $\mu m$. In use, an electric field is applied via the electrode and its strength controlled and changed to move the second mirror 12 through the first order side burst.

The electrode 22 is graphene on quartz, such that it is transparent and so has a minimal impact on the optical cavity 13 formed between the first and second mirrors 11, 12.

Figure 11:
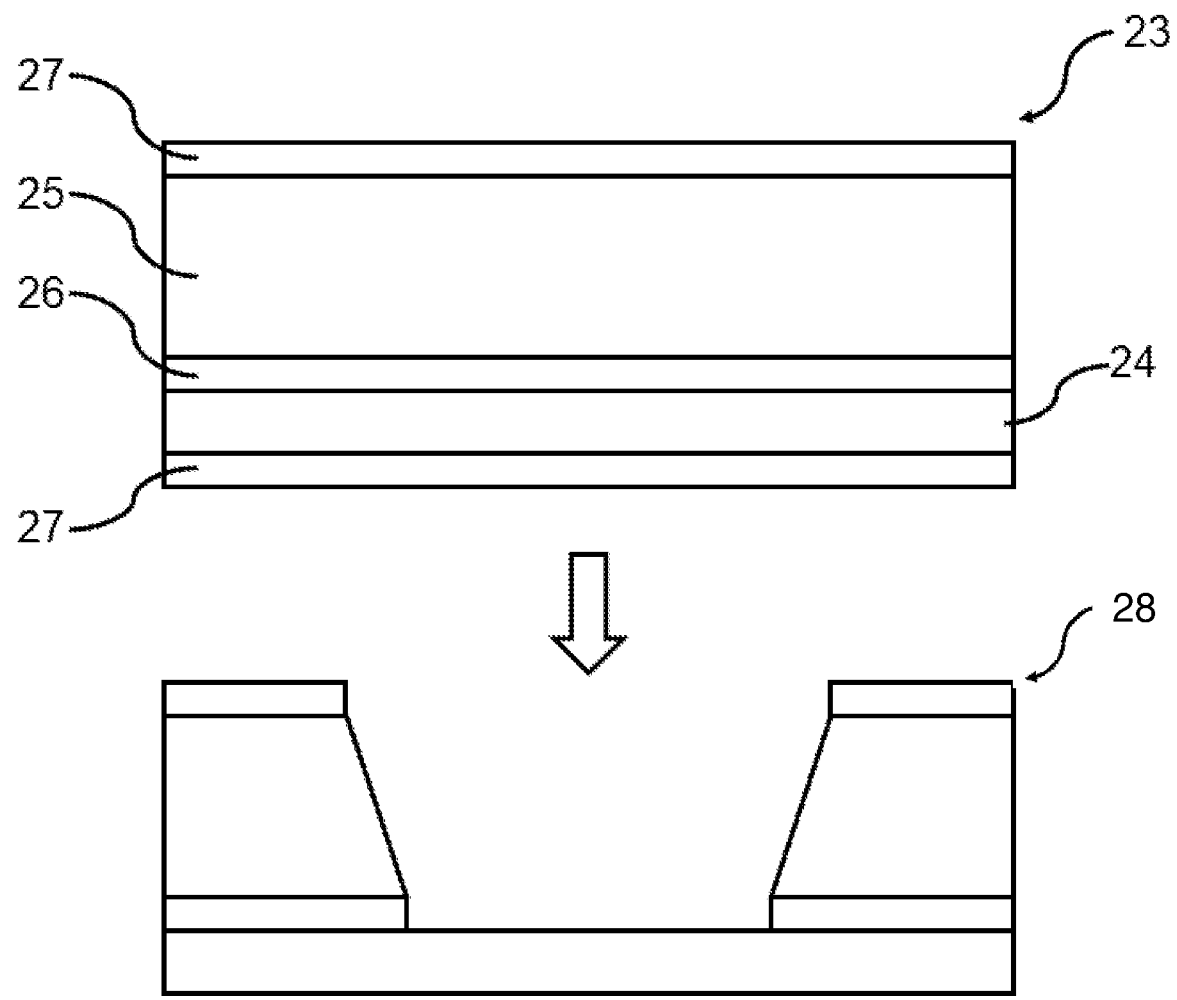
FIG. 11 shows the step-by-step process in forming a first mirror of an infra-red Fourier Transform spectrometer.

As shown in FIG. 11, the first mirror 11 is formed from a block 23 comprising two layers of silicon 24, 25. The first layer 24 is approximately 500 $\mu m$ and the second layer 25 is approximately 30-50 $\mu m$. Between the first and second layers 24, 25 is sandwiched a thin insulator layer 26. Sandwiching the first and second layers 24, 25 and the insulator layer 26 are two thin layers of silicon nitride 27.

To form the first mirror 11, as shown in FIG. 11 part of the second layer of silicon 25 and the layer of silicon nitride 27 covering it are cut away using photolithograph (reactive ion etching for the silicon nitride layer 27, and potassium hydroxide for etching the silicon 25) to expose the insulator layer 26. The second layer 26 and the covering silicon nitride layer 27 are etched such that the cut-out section has a square cross section and slopes down to the silicon 24.

The resulting cap 28 forms the first mirror 11, the cavity 13 and part of the walls 30, the middle of the first layer of silicon 24 being the first mirror 11, the cut-out section forming the cavity 13 and the remainder of the block 23 forming the parts of the walls 30.

Figure 12:
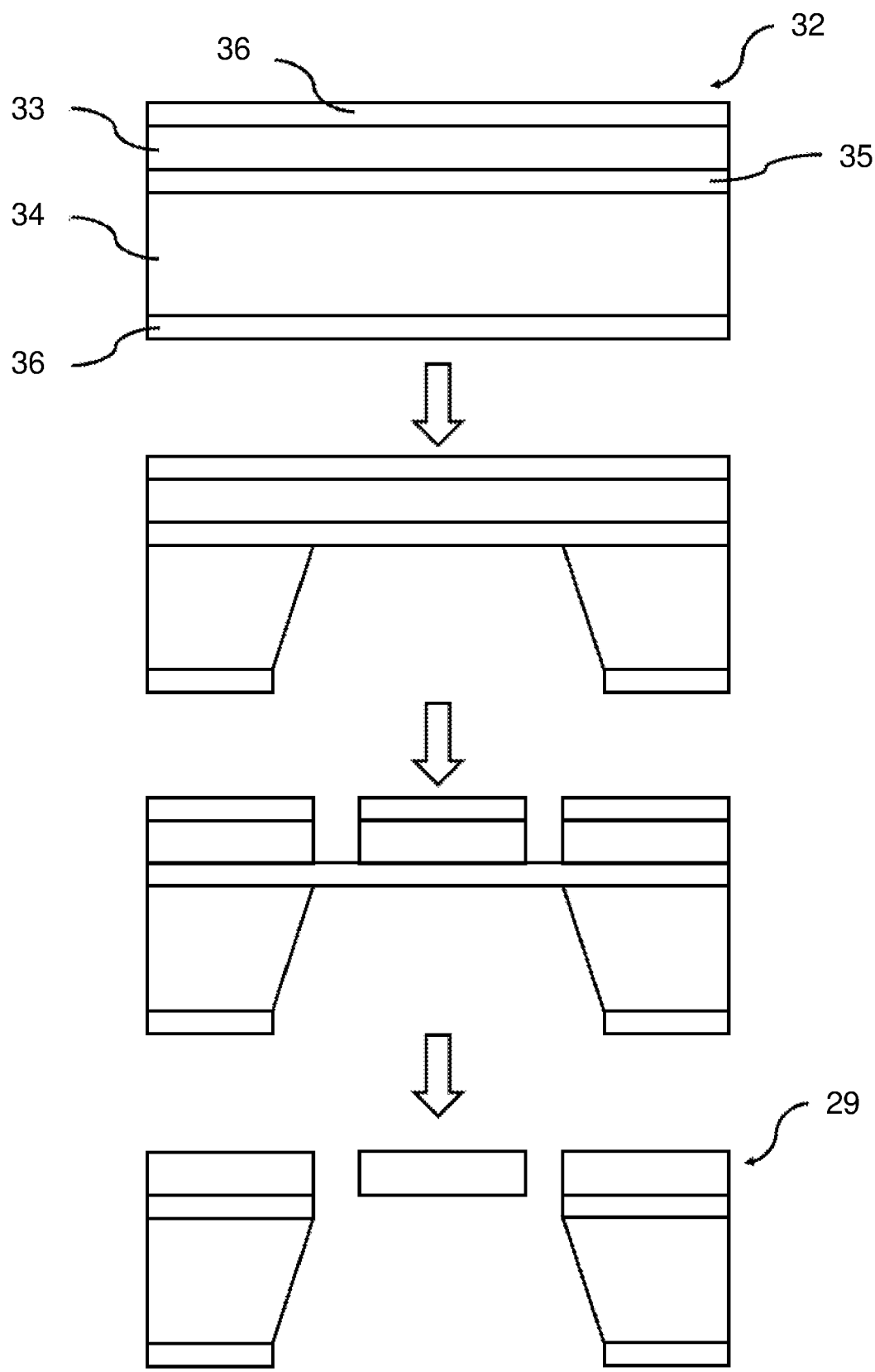
FIG. 12 shows the step-by-step process in forming a second mirror of an infra-red Fourier Transform spectrometer.

As shown in FIG. 12, the second mirror 12 is formed from a block 32 comprising two layers of silicon 33, 34. The first layer 33 is approximately 10 $\mu m$ and the second layer 34 is a few hundred micrometres, for example approximately 500 $\mu m$. Between the first and second layers 33, 34 is sandwiched a thin insulator layer 35. Sandwiching the first and second layers 33, 34 and the insulator layer 35 are two thin layers of silicon nitride 36.

For the second mirror 12, as shown in FIG. 12 a cap 28 is formed as it is for the first mirror 11. Once this is done, lithography is used, in particular deep reactive-ion etching, to cut the spiral flexures (not shown in FIG. 12) into the first layer 33. When doing this, the silicon nitride layer 36 atop the first layer 33 is also removed from atop the spiral flexures 21.

The next step is to remove the insulator 35 on the mirror 12 and the spiral flexures 21 using vapour-phase hydrofluoric acid. To complete the process, the remaining layer of silicon nitride 36 from atop the first layer 33 to form the micro-electromechanical system (MEMS) 29. The sections of the MEMS 29 other than the second mirror 12 and the spiral flexures 21 form the walls 30 of the interferometer with the sections of the cap 28.

To form the interferometer 10, the MEMS 29 is placed atop the electrode 22, the cut-out section of the MEMS 29 between the second mirror 12 and the electrode 22. The cap 28 is then placed atop the MEMS 29 such that the MEMS 29 is between the cap 28 and the electrode 22, the cut-out section of the MEMS 29 between the second mirror 12 and the electrode 22. All three are then fixed in place, and a detector is positioned behind the electrode 22 and second mirror 12. A light source can be built into the system behind the front mirror 11. Alternatively, the system can be set up to use an external light source.

The infra-red Fourier Transform spectrometer 10 has a broad spectral range of approximately 1-2.6 $\mu m$ and a spectral resolution down to approximately 10 nm, while the interferometer is only tens of millimetres cubed in size (having dimensions of approximate 4 by 4 by 1.5 mm, and so a volume of 24 $mm^3$). Accordingly, the infra-red Fourier Transform spectrometer 10 can be incorporated into mobile electronic devices such as mobile phones and tablets, providing said mobile electronic devices with the functionality of spectrometers.

Figure 14:
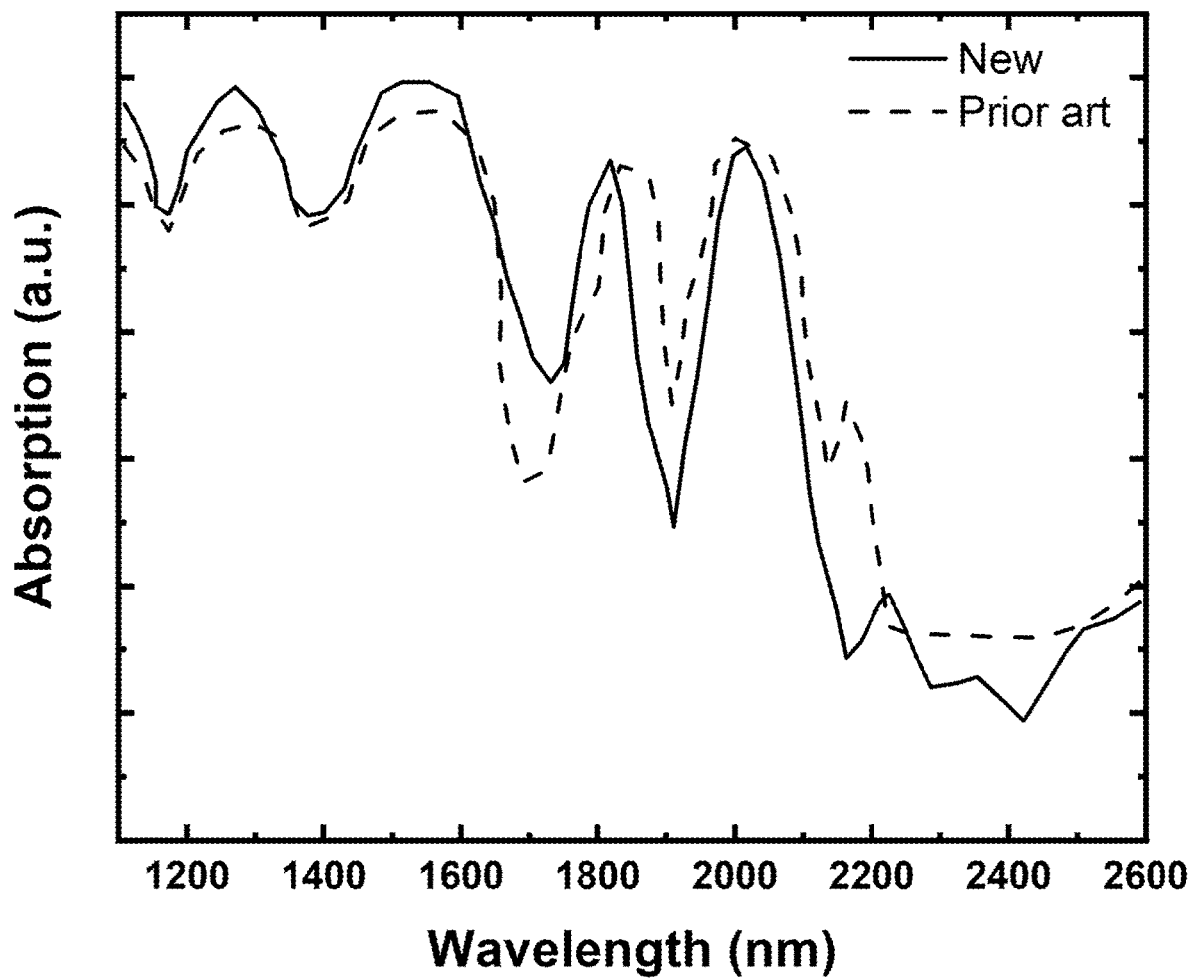
FIG. 14 shows the spectrums obtained for acrylic by an infra-red Fourier Transform spectrometer and a prior art spectrometer.

As shown in FIG. 14 by the side-by-side comparison of the spectrum for acrylic obtained by the infra-red Fourier Transform spectrometer 100 versus the spectrum for the same material obtained by a prior art spectrometer, the spectrum obtained is comparable to conventional spectrometers and usable to identify substances with known spectrums.

Figure 15:
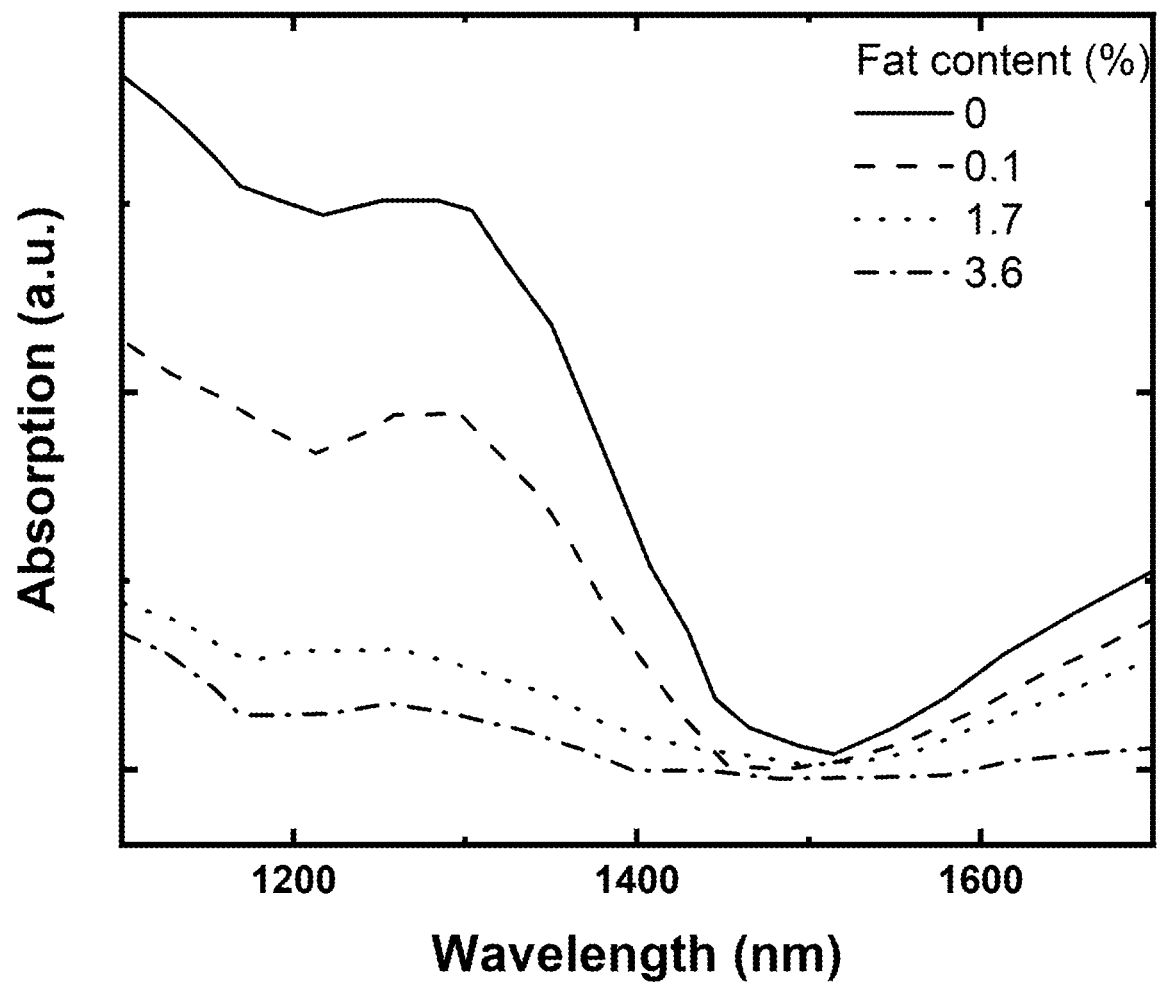
FIG. 15 is the spectrums obtained for milks of various fat contents.

As shown by FIG. 15, the infra-red Fourier Transform spectrometer 100 is precise enough to differentiate between substances with similar spectrums—in the case shown in the figure, milk with different fat contents.

The one or more embodiments are described above by way of example only. Many variations are possible without departing from the scope of protection afforded by the appended claims.

The invention claimed is:

1. A Fourier transform spectrometer comprising an interferometer comprising a fixed mirror, a movable mirror, a circuit, an electrode and a detector, wherein: the mirrors are positioned parallel to each other and form an optical cavity; the movable mirror is operable to move relative to the fixed mirror to change the length of the optical cavity; a first mirror of the mirrors is positioned such that light received enters the optical cavity through a back of the first mirror; the detector is positioned and operable to detect light which has exited the optical cavity through a back of the second mirror of the mirrors and output an interferogram; the mirrors are distanced from each other such that the movable mirror is at or can move to a position where at least two optical paths to the detector for received light reflected within the interferometer are of equal length; the movable mirror and electrode positioned at a distance from each other and the circuit connected to the movable mirror and the electrode and operable to apply an electric field between them to move the movable mirror with respect to the fixed mirror; and the electrode is positioned such that the movable mirror lies between the fixed mirror and the electrode.

2. A Fourier transform spectrometer according to claim 1, wherein the mirrors comprise silicon.

3. A Fourier transform spectrometer according to claim 1, wherein the interferometer comprises a housing.

4. A Fourier transform spectrometer according to claim 3, wherein the interferometer comprises one or more elastic elements connecting the movable mirror to the housing, the movable mirror movable upon the or each elastic element.

5. A Fourier transform spectrometer according to claim 4, wherein the or each elastic element is a flexure.

6. A Fourier transform spectrometer according to claim 1, wherein the electrode comprises graphene.

7. A Fourier transform spectrometer according to claim 6 wherein the electrode comprises graphene on quartz.

8. A Fourier transform spectrometer according to claim 1 wherein the mirrors are distanced from each other such that the movable mirror is at or can move to a position where the optical cavity is between 20-45 μm.

9. A Fourier transform spectrometer according to claim 8, wherein the mirrors are distanced from each other such that the movable mirror is at or can move to a position where the optical cavity is between 25-40 μm.

10. A Fourier transform spectrometer according to claim 9 wherein the mirrors are distanced from each other such that the movable mirror is at or can move to a position where the optical cavity is between 30-35 μm.

11. A Fourier transform spectrometer according to claim 1 comprising an analysis unit operable to receive the interferogram and perform a Fourier transform on it to obtain an optical spectrum for the sample.

12. A Fourier transform spectrometer according to claim 11 wherein the analysis unit is operable to perform the Fourier transform on an order of interference other than the zero-order interference.

13. A Fourier transform spectrometer according to claim 12 wherein the analysis unit is operable to perform the Fourier transform on the first-order interference.

14. A method of Fourier transform spectroscopy comprising the steps of providing a Fourier transform spectrometer of claim 1, moving the movable mirror of the interferometer from or through a position where at least two paths for light reflected within the interferometer are equal length and detecting light at the detector of the interferometer to obtain an interferogram for a sample, and applying a Fourier transform to an order of interference of the interferogram other than a zero-order interference to obtain a spectrum.

15. A method of Fourier transform spectroscopy according to claim 14 comprising applying the Fourier transform to a first order interference.

\* \* \* \* \*